United States Patent
Wellhausen

(10) Patent No.: US 12,387,581 B2
(45) Date of Patent: Aug. 12, 2025

(54) METHOD AND DEVICE FOR DETECTING SMOKE

(71) Applicant: Robert Bosch GmbH, Stuttgart (DE)

(72) Inventor: Andreas Wellhausen, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 321 days.

(21) Appl. No.: 17/613,674

(22) PCT Filed: May 19, 2020

(86) PCT No.: PCT/EP2020/063957
§ 371 (c)(1),
(2) Date: Nov. 23, 2021

(87) PCT Pub. No.: WO2020/239540
PCT Pub. Date: Dec. 3, 2020

(65) Prior Publication Data
US 2022/0230519 A1 Jul. 21, 2022

(30) Foreign Application Priority Data

May 27, 2019 (DE) ..................... 10 2019 207 711.0

(51) Int. Cl.
*G08B 17/12* (2006.01)
*G06T 7/00* (2017.01)
*G06T 7/73* (2017.01)

(52) U.S. Cl.
CPC .......... *G08B 17/125* (2013.01); *G06T 7/0002* (2013.01); *G06T 7/73* (2017.01);
(Continued)

(58) Field of Classification Search
CPC ........ G06N 3/044; G06N 3/045; G06N 3/084; G06T 2207/20081; G06T 2207/20084;
(Continued)

(56) References Cited

U.S. PATENT DOCUMENTS 10,013,640 B1 * 7/2018 Angelova ............ G06V 10/454
10,929,996 B2 * 2/2021 Angelova .............. G06N 3/044
(Continued)

FOREIGN PATENT DOCUMENTS

CN 107451552 A 12/2017
CN 108830305 A 11/2018
(Continued)

OTHER PUBLICATIONS

Hu et al., Real-Time Fire Detection Based on Deep Convolutional Long-Recurrent Networks and Optical Flow Method, Proceedings of the 37th Chinese Control Conference (Year: 2018).*

(Continued)

*Primary Examiner* — Kenny A Cese
(74) *Attorney, Agent, or Firm* — Michael Best & Friedrich LLP

(57) ABSTRACT

The invention relates to a machine learning system (10) which is configured, on the basis of a plurality of images captured in succession, to detect smoke (12) within the images. The machine learning system (10) comprises a convolutional recurrent neural network. The invention also relates to a method for detecting smoke by means of this machine learning system.

17 Claims, 3 Drawing Sheets

(52) U.S. Cl.
CPC ............... *G06T 2207/20081* (2013.01); *G06T 2207/20084* (2013.01); *G06T 2207/30232* (2013.01)

(58) Field of Classification Search
CPC ......... G06T 2207/30232; G06T 7/0002; G06T 7/73; G08B 17/125; G08B 29/186
See application file for complete search history.

(56) References Cited

U.S. PATENT DOCUMENTS

| | | | | |
|---|---|---|---|---|
| 11,275,989 | B2* | 3/2022 | Tschernezki | G06N 3/044 |
| 2018/0253839 | A1* | 9/2018 | Zur | A61B 1/000094 |
| 2018/0260951 | A1* | 9/2018 | Yang | G06N 3/084 |
| 2018/0349477 | A1* | 12/2018 | Jaech | G06F 16/9535 |
| 2019/0331832 | A1* | 10/2019 | Chandra | G01W 1/06 |
| 2020/0388028 | A1* | 12/2020 | Agus | G06F 18/211 |

FOREIGN PATENT DOCUMENTS

| | | |
|---|---|---|
| CN | 109582794 A | 4/2019 |
| DE | 102014216644 A1 | 2/2016 |
| JP | 2018101317 A | 6/2018 |
| JP | 2018101416 A | 6/2018 |

OTHER PUBLICATIONS

Hu et al., "Real-Time Fire Detection Based on Deep Convolutional Long-Recurrent Networks and Optical Flow Method," Proceedings of the 37th Chinese Control Conference, Jul. 25-27, 2018, Wuhan, China (Year: 2018).*

Medel et al., "Anomaly Detection in Video Using Predictive Convolutional Long Short-Term Memory Networks," Rochester Institute of Technology, Rochester, New York (Year: 2016).*

Translation of International Search Report for Application No. PCT/EP2020/063957 dated Sep. 7, 2020 (3 pages).

Luo et al., "A Slight Smoke Perceptual Network", IEEE Access, vol. 7, 2019, pp. 42889-42896.

Filonenko et al., "Smoke Detection on Video Sequence Using Convolutional and Recurrent Neural Networks", Annual International Conference on the Theory and Applications of Cryptographic Techniques, 2017, pp. 558-566.

Hu et al., "Real-Time Fire Detection Based on Deep Convolutional Long-Recurrent Networks and Opitcal Flow Method", Proceedings of the 37th Chinese Control Conference, 2018, pp. 9061-9066.

Han et al., "Predictive Models of Fire via Deep learning Exploiting Colorific Variation", IEEE International Conference on Artificial Intelligence in Information and Communication, 2019, pp. 579-581.

Shi et al., "Convolutional LSTM Network: A Machine Learning Approach for Precipitation Nowcasting", arXiv 2015, pp. 1-11.

Yin et al., "Recurrent Convolutional Network for Video-based Smoke Detection," Multimedia Tools Applications, 2019, vol. 78, pp. 237-256.

Guo et al., "Hierarchical LSTM for Sign Language Translation," 32nd AAAI Conference on Artificial Intelligence, 2018, pp. 6845-6852.

Chen et al., "Image Identification of Forest Fire Smoke Based on Convolutional Neural Network Algorithm," Instrumentation Technology, 2019, Issue 5, 8 pages including English Translation.

Zapata-Impata et al., "Learning Spatio Temporal Tactile Features with a ConvLSTM for the Direction of Slip Detection," Sensors, 2019, vol. 19, 16 pages.

* cited by examiner

METHOD AND DEVICE FOR DETECTING SMOKE

BACKGROUND OF THE INVENTION

The invention relates to a machine learning system with a specific recurrent module for detecting smoke and a method for detecting smoke using this machine learning system.

A method for detecting fire is known from DE 10 2014 216 644 A1. Using cameras that observe areas to be monitored, the images output by the cameras are checked for the appearance of characteristics of fire, such as flames, smoke columns, etc., using digital image processing.

In the publication "Convolutional LSTM network: A machine learning approach for precipitation nowcasting." Advances in neural information processing systems, the authors Xingjian et al. disclose a convolutional LSTM (or ConvLSTM).

SUMMARY OF THE INVENTION

In a first aspect of the invention, a specific machine learning system, in particular a neural network, is proposed, which has both a short-term memory and a long-term memory. This has the advantage that the machine learning system can extract global information from the image and process it, in particular the image region from which spatially relevant information originates, and temporal, local information, such as local object movements in a plurality of successive images. This allows the machine learning system to extract local dynamic textures, which are characteristic of smoke, particularly well. This allows smoke to be detected particularly reliably using this machine learning system.

The machine learning system of the first aspect of the invention is parameterized in such a way that on the basis of a plurality of images, captured in particular in direct succession, it detects smoke within the images. The machine learning system is characterized in that it comprises a convolutional recurrent neural network (ConvRNN), such as a convolutional LongShortTermMemory module (convolutional LSTM, referred to below as ConvLSTM).

For video-based detection of smoke, image processing methods such as color or motion detection and texture analyses can be used. In addition, smoke can also be detected on the basis of an optical flow determined from a video recording. In this case, smoke is detected on the basis of its typically upwards directed movement characteristic. However, the smoke must be sufficiently dense in order to detect movement using the optical flow. In addition, the typical smoke movement must be present for a sufficiently long time to ensure that it is in fact smoke and not some other object.

The advantage is that smoke detection is provided which has a low false alarm rate without reducing the detection rate. Furthermore, smoke detection can be carried out reliably even under special constraints, such as in tunnels, ports, or on runways.

Another advantage is that slowly moving objects such as escalators do not cause false alarms. These objects can cause false alarms when smoke is detected by means of optical flow, because they cannot be distinguished from smoke in the optical flow.

The advantage of the ConvRNN, in particular the ConvLSTM, is that it processes time information and global information of the image together. This is important for detecting smoke, as smoke is typically characterized by local, dynamic textures, which can therefore be extracted particularly well using the ConvRNN/-LSTM. Comparable reliability and accuracy cannot be achieved by combining convolutional neural networks and recurrent neural networks. This is because a machine learning system made up of these two different types of neural networks is not able to extract and process the important temporal and global information from the images simultaneously. However, since the machine learning system of the first aspect is able to process temporal and global information together, this machine learning system provides particularly reliable and accurate results when used for smoke detection.

A ConvLSTM is a specific type of LSTM, which is shown in the document by the authors Xingjian et al. In a (Conv-)LSTM, two output variables are determined on the basis of three input variables. A first of the input variables can be the output variable of the immediately preceding layer of the (Conv-)LSTM, while the other two input variables can be output variables of an, in particular immediately preceding, (Conv-)LSTM calculation. A first of the output variables can be the output variable of the (Conv-)LSTM which is passed on to an, in particular immediately following, layer of the machine learning system. The second output variable is a variable that characterizes an internal state of the (Conv-)LSTM. In a ConvLSTM, the first input variable and the first output variable of the previous calculation of the ConvLSTM are filtered. This means that the ConvLSTM differs from the "normal" LSTM in that instead of scalar multiplications, a convolution of its input variable with at least one filter is performed. It should be noted that the results of the filtering of the two input variables of the ConvLSTM are then summed and can be processed by means of an activation function. A plurality of different filters can be used. It is also conceivable that the results of the plurality of the filter operations are summed before these summed results are then processed by means of the activation function(s). The output variables of the ConvLSTM are determined based on the results of the activation functions. For a mathematical definition of the ConvLSTM, see equation (3) of the document by Xingjian et al.

It should be noted that when the images are processed by the machine learning system they are each processed by the convolutional recurrent neural network. It should also be noted that the detection of smoke is output on the basis of a determined output variable of the convolutional recurrent neural network.

The time window considered for the plurality of the captured images is preferably between one second and three seconds. Previous approaches are not able to detect thin smoke with such short time windows.

Parameterized means that the machine learning system is configured to detect smoke. Parameterized can also mean that parameters of the machine learning system have values such that the machine learning system detects smoke within the images, or whether the images contain smoke. Preferably, the values of the parameters have been adjusted during the training of the machine learning system, so that the machine learning system detects smoke.

Smoke can be understood as a mixture of a solid phase in a gaseous phase. Smoke can also be understood as an aerosol in a finely distributed form produced by combustion and consisting of particles such as dust or ash particles and/or liquid droplets (water, oil vapors, acid vapors, liquid combustion residues), in particular contained in the exhaust gas.

It is proposed that the machine learning system is further parameterized in such a way that it outputs an output variable that characterizes whether smoke is represented within the respective image processed by the machine learning system. Characterizing can be understood as a process of classifying the images. Preferably, the variable additionally characterizes a position within the image at which the smoke was detected. For example, the variable also characterizes a "bounding box" that frames the detected smoke.

It is also proposed that the machine learning system is parameterized in such a way that the machine learning system outputs a matrix as the output variable. The elements of the matrix are each assigned to a section of a plurality of sections within the processed image by means of the machine learning system. The elements of the matrix characterize whether smoke is represented within this assigned section of the image. The advantage of this is that a localization of the smoke within the image is achieved.

Furthermore, it is proposed that the output variable or the elements of the matrix each characterize a probability. It is also conceivable that the machine learning system is parameterized, in particular configured, to segment the smoke within the image.

It is also proposed that the machine learning system comprises a plurality of concatenated ConvLSTMs. A number of filters that the respective ConvLSTM comprises increases as the depth of the machine learning system increases and, in particular, a resolution of the processed image decreases with increasing depth of the machine learning system. A pooling layer is connected between each of the ConvLSTMs. The final ConvLSTM is connected to a fully connected neural network, which outputs the output variable of the machine learning system. As the input variable, the neural network receives an output variable determined by the last ConvLSTM.

A pooling layer can be understood as a layer that removes information from its input variable, in particular within one section of a plurality of sections of that input variable. The pooling layer can perform a so-called average pooling or a max-pooling. It should be noted that the fully connected neural network can act as a so-called classifier and localizer. Preferably, sigmoid functions are used as activation functions in this neural network, and in the ConvRNN/-LSTM tanh and hard-sigmoid activation functions are used.

Furthermore, it is proposed that instead of the fully connected neural network a so-called fast convolutional recurrent neural network (fast R-CNN), in particular a "region-proposal" neural network (RPN), is used. The advantage of this is that flexible smoke can be localized within the image.

The depth of the machine learning system can be understood to mean a position within the sequence of the ConvLSTM of the machine learning system relative to the ConvLSTM which receives the input variable of the machine learning system.

It is also proposed that the machine learning system is connected to an optical, visual and/or acoustic warning device, such as a smoke/fire alarm. It is also conceivable that the machine learning system is part of a fire alarm system, which is preferably connected to a building management system. It is also conceivable that the machine learning system can be connected to a security control center, e.g. via the internet or an intranet. In addition or alternatively, a plurality of cameras can be connected to the machine learning system, and the machine learning systems are connected to the fire alarm system and/or the security control center via a network. Alternatively or additionally, an alarm or alarm decision is determined that depends on the detected smoke. It is conceivable that the alarm or alarm decision is transmitted via the network to the fire alarm system, and/or to the security control center.

It is also conceivable that the alarm or the alarm decision will be forwarded to a central monitoring station and cross-checked by a human being. In addition or alternatively, one of the images with the smoke detected by the machine learning system and/or with the detected alarm (region) can be transmitted to the monitoring station.

The machine learning system can be integrated into the camera or can be operated on a server in a local or global network to which the cameras of a building are connected.

The advantage of this is that the alarm decision is taken based on all previous images propagated through the machine learning system. For example, in the case of an alarm decision, after the third image three images are already input to the alarm decision and after the 42nd image a total of 42 images are input into the alarm decision.

It is also proposed that the one input of the machine learning system is connected to a camera. Connected here can be understood to mean that the images captured by the camera are provided to the machine learning system as an input variable in each case, wherein the camera captures the plurality of images and provides the images consecutively as one input variable. The camera can be an image/video/infrared and/or an event-based camera.

In a second aspect of the invention, a method, in particular computer-implemented, for detecting smoke within an image by means of the machine learning system is proposed. The machine learning system is the machine learning system according to the first aspect of the invention. The machine learning system comprises a plurality of layers connected in a specified sequence and at least one of the layers comprises the Conv-RNN or ConvLSTM. The method comprises the steps: receiving a plurality of images, captured in particular in direct succession. This is followed by propagating the plurality of the captured images through the machine learning system in succession. During the propagation, the images are processed successively by the layers of the machine learning system and the final layer of the sequence of layers outputs the output variable of the machine learning system. It should be noted that the final layer is parameterized to output the output variable of the machine learning system. The output variable characterizes whether smoke is represented within the image. It should also be noted that smoke is detected on the basis of the output variable of the machine learning system. It should be noted that the plurality of images can be propagated through the machine learning system successively or simultaneously.

In addition, depending on the output variable of the machine learning system, the output can indicate whether smoke is represented within the image. It is also conceivable that depending on the output variable, an intensity, or quantity and/or density of the smoke is determined and, if appropriate, output.

It should be noted that the machine learning system of the first aspect of the invention, with all its different embodiments, can be used for the second aspect of the invention.

It should be noted that the images of the first and second aspects can be, for example, RGB images, grayscale images, flow images, or image differences that are captured with a photograph camera or video camera. Furthermore, it is proposed that the images are enriched with additional information, and/or optical flow, or alternatively image differences. This has the advantage that it allows even more reliable and accurate smoke detection.

It is also proposed that the machine learning system is trained on the basis of a plurality of training data comprising training images and respectively assigned training output variables. During training, the training images are propagated through the machine learning system. On the basis of the determined output variables of the machine learning system and the respectively assigned output variables of the training images, a parameterization of the machine learning system is adjusted in such a way that a deviation between the determined output variables and the training output variables becomes a minimum.

Preferably, the minimization, in particular optimization, of the deviation is carried out by means of a gradient descent method, e.g. back propagation-through-time. The deviation can be a difference. The deviation can be achieved by means of a mathematical distance measure.

It is further proposed that the training images comprise images that contain only images with and without smoke. In addition, the training images can also contain images that also show flames, or sites of fire in addition to smoke. This also allows the machine learning system to learn how to detect fires.

It is also proposed that the machine learning system is compressed after the training, for example by means of a so-called pruning process. The advantage of this is that it allows the system to be used in a mobile terminal.

Furthermore, it is proposed that a smoke detector is activated on the basis of the determined variable of the machine learning system.

In addition or alternatively, a warning device according to the first aspect can be activated based on the output variable of the machine learning system. The warning device, such as the smoke detector, can issue a warning signal if smoke has been detected based on the output variable of the machine learning system. In addition or alternatively, the other systems mentioned above according to the first aspect of the invention can be activated, or the alarm or alarm decision can be made available to these systems.

In a further aspect, a computer program is proposed. The computer program is configured to execute one of the previously mentioned methods. The computer program comprises instructions that cause a computer to execute one of the above methods with all its steps when the computer program is run on the computer. A machine-readable storage module is also proposed, on which the computer program is stored. A device which is configured to execute one of the methods is also proposed.

BRIEF DESCRIPTION OF THE DRAWINGS

In the following, exemplary embodiments are described in more detail by reference to the accompanying drawings. In the drawings.

DETAILED DESCRIPTION

Figure 1:
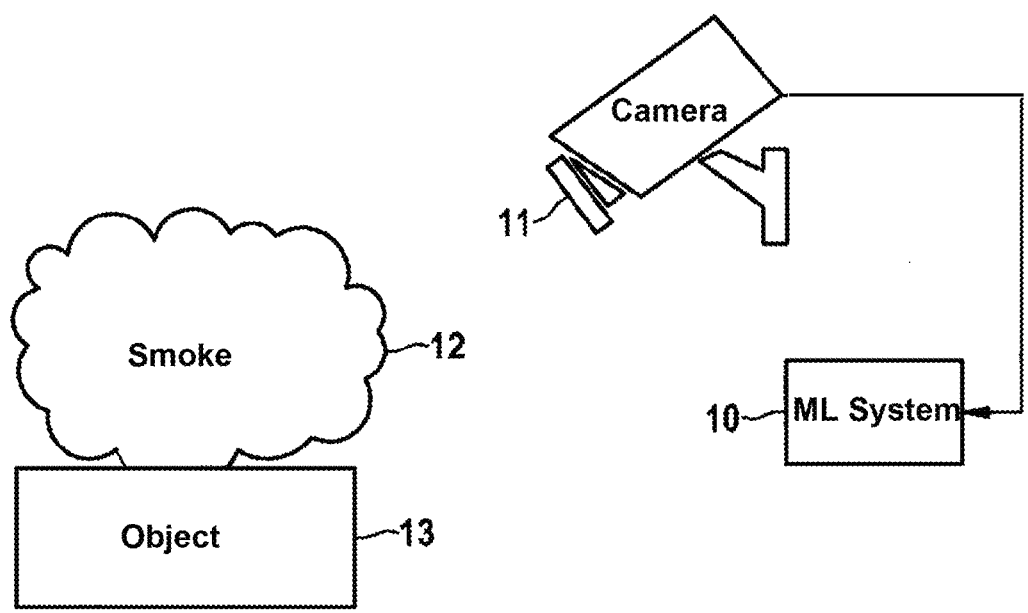
FIG. 1 shows a schematic structure of a device for detecting smoke.

FIG. 1 shows an exemplary embodiment of a device for detecting smoke (12). The device in this embodiment comprises a camera (11) which is connected to a machine learning system (10). The camera (11) captures a plurality of images from an environment of the camera (11). For example, if smoke develops in the area surrounding the camera (11) because an object (13) is burning or overheating, the camera images will contain smoke (12). The plurality of images from the camera are processed in succession by the machine learning system (10). The machine learning system (10) is parameterized in such a way that, on the basis of the images processed in succession, it outputs an output variable which characterizes whether smoke (12) is represented within the respective image. On the basis of one or a plurality of the output variables of the machine learning system, the smoke can be detected.

In a further embodiment of the device, the machine learning system (10) is connected to a smoke detector, for example. The smoke detector determines whether or not the machine learning system should trigger an alarm, depending on the output variable of the machine learning system.

Figure 2:
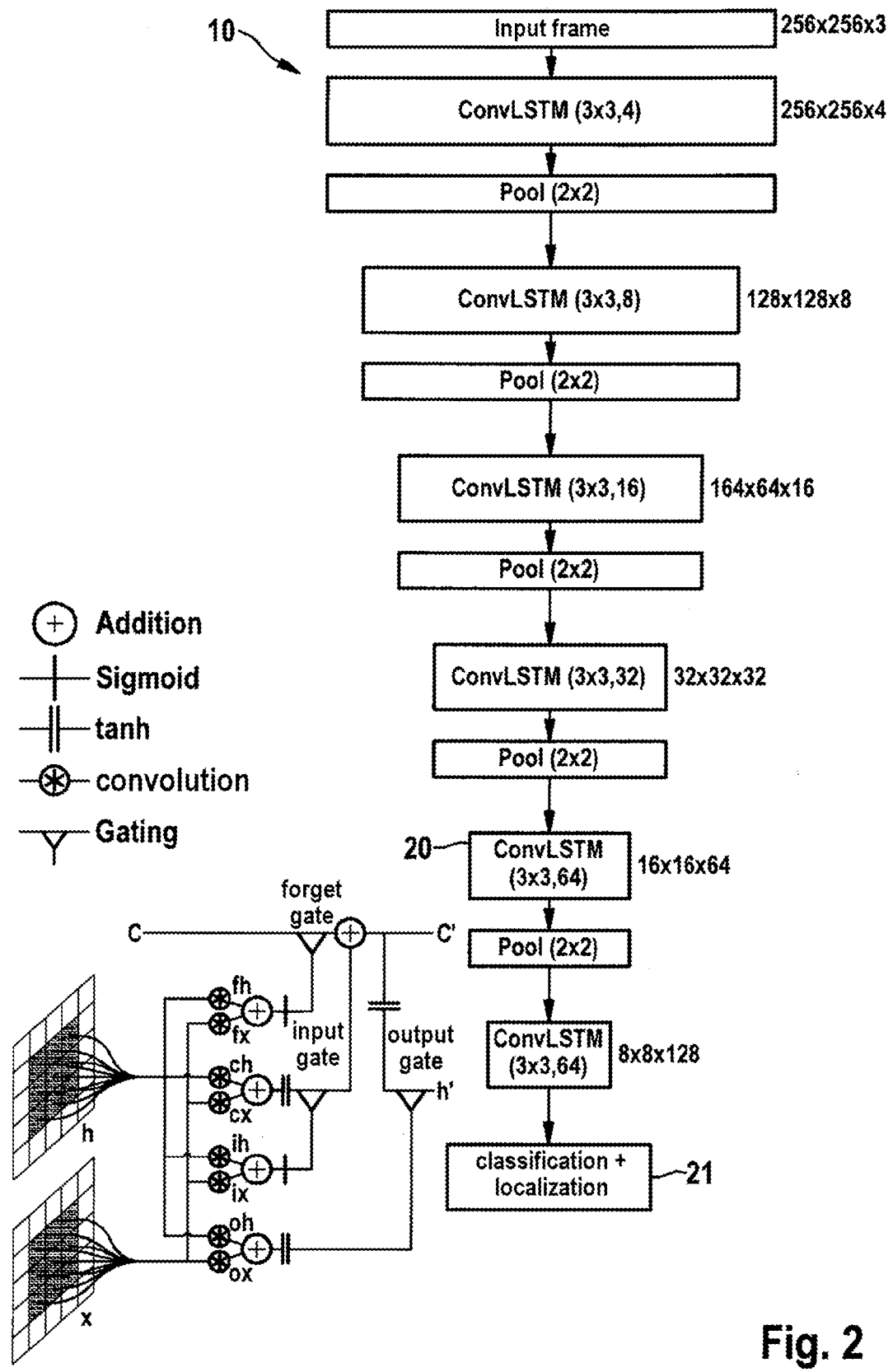
FIG. 2 shows a schematic drawing of a machine learning system which is parameterized to detect smoke.

FIG. 2 shows a schematic structure of the machine learning system (10). In FIG. 2, the machine learning system (10) is provided by a neural network as an example. In the embodiment illustrated in FIG. 2, the machine learning system (10) comprises a plurality of layers which are connected to each other in a predetermined sequence. The layers are either ConvLSTM (20) or pooling layers, which perform e.g. an average/max-pooling. The sequence shown in FIG. 2 is such that a pooling layer follows each ConvLSTM (20). In addition, the final layer of the machine learning system (10) can be connected to a fully connected neural network (21). Preferably, the fully connected neural network (21) is a classifier that outputs a classification as to whether the image processed by the machine learning system (10) contains smoke. Alternatively, the fully connected neural network can output a matrix, each of the elements of which is assigned to a section of a plurality of sections of the processed image and the elements each characterize whether smoke is represented within the respective section. This then corresponds to a localization of the smoke within the image.

FIG. 2 also indicates examples of the resolutions of the input variables of the layers, shown above the respective layers. The input variable (FIG. 2: "input frame") of the machine learning system (10), i.e. the image processed by the machine learning system (10), has a resolution of 256×256×3 in this embodiment. An example of how the respective layers are configured is also shown. For example, the first ConvLSTM layer is configured by 4 filters, each having a resolution of 3×3.

FIG. 2 also shows a schematic structure of the ConvLSTM (20).

The ConvLSTM (20) receives three different input variables (x,h,c). Based on these three input variables (x,h,c), the ConvLSTM (20) determines two output variables (c',h'). A first input variable (x) is the input variable of the respective ConvLSTM layer, or the image. A second input variable (h) is a previously determined output variable of the ConvLSTM (20) at a processing/time step, in particular an immediately preceding one. This means that this determined output variable contains information from the previous processed input variables of this ConvLSTM. A third input variable (c) is an internal state of the ConvLSTM (20), which is updated depending on the first and second input variables (x,h), in particular at each processing/time step.

In order to determine the two output variables (h',c'), the first and second input variables are filtered by means of different filters (fh,fx,ch,cx,ih,ix,oh,ox) and summed according to the combinations shown in FIG. 2. An activation function is then applied to the respective summed results. The activation function is formed by way of example as a sigmoid/tanh function in FIG. 2.

The results of the activation functions are then processed according to the combinations shown in FIG. 2 in a so-called input gate, forget gate and output gate to produce the output variables (c',h').

Figure 3:
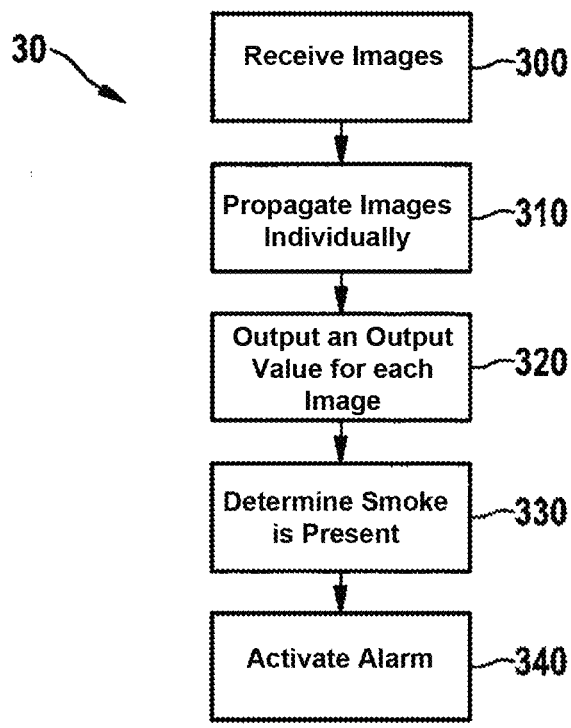
FIG. 3 shows a schematic drawing of a flowchart of a method for detecting smoke by means of the machine learning system.

FIG. 3 shows a schematic flowchart (30) of a method for detecting smoke.

The method starts at step 300. In this step, the machine learning system (10) receives the plurality of the images captured from the camera (11) in succession.

In the following step 310, the individual images are propagated through the machine learning system (10) in succession.

In step 320, the machine learning system (10) outputs an output variable after each of the images has been propagated through the machine learning system.

In the following step 330 it can then be decided, based on the output values output by the machine learning system (10), whether smoke is present in the area surrounding the camera. This can be carried out, for example, by comparing the output variable of the machine learning system with a threshold value. If the output variable is greater than the threshold value, the decision can be made that smoke is present. Optionally, step 340 can be performed after completing step 330. Depending on the result of step 330, a smoke detector is activated there. For example, the smoke detector can issue a warning signal such as a warning tone if the output variable of the machine learning system has exceeded the threshold value.

In a further embodiment of the method for detecting smoke, the machine learning system (10) can be trained before step 300 is executed.

When training the machine learning system (10), an optimization method, preferably a gradient descent method such as backpropagation-through-time, is used to optimize the parameterization of the machine learning system with respect to a loss function. The loss function characterizes a difference between determined output variables and supplied training output variables based on the parameterization. To optimize the parameterization, gradients can be determined using the gradient descent method, the parameterization then being adjusted according to the gradients determined.

Training data containing training images is provided for training purposes, and the machine learning system determines the output values based on these. Furthermore, the training output variables are assigned to the training images.

The training step can be executed several times in succession until a predefined abort criterion is met, for example until the difference or a change in this difference is less than a predefined value.

Figure 4:
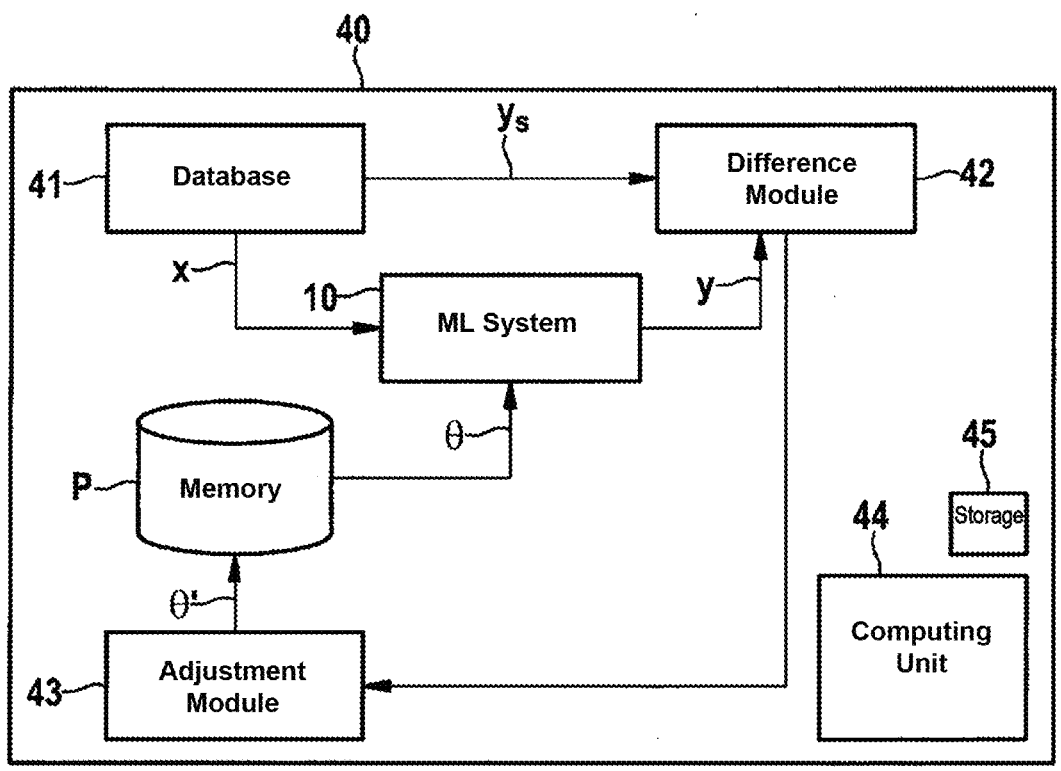
FIG. 4 shows a schematic drawing of a device which can be used for training the machine learning system.

FIG. 4 shows a schematic drawing of a device (40) for training the machine learning system (10). The device (40) comprises a database (41) which contains training data. The training data comprises labeled images (x), the labels ($y_s$) of which characterize whether smoke is represented within the image. The images (x) are processed by the machine learning system (10) and provided to a difference module (42) as an output variable (y). The difference module (42) also receives the labels ($y_s$) and determines a difference based on the labels ($y_s$) and the output variables (y), which is then passed on to the adjustment module (43). Depending on the difference, the adaptation module then determines a change (θ') in the parameterization (θ) of the machine learning system (10). The parameterization (θ) is then adjusted in a memory (P) based on the change (θ').

Furthermore, the device (40) can comprise a computing unit (44) and a storage element (45).

The invention claimed is:

1. A machine learning system comprising:
    a convolutional recurrent neural network, wherein the machine learning system is parameterized, on the basis of successive images of a sequence of images, to detect smoke in the images, and wherein the convolutional recurrent neural network is configured as a plurality of concatenated convolutional LongShortTermMemory (convolutional LSTM) modules connected to each other in a predetermined sequence;
    wherein a first convolutional LSTM module in the predetermined sequence is configured to receive an input variable from the sequence of images,
    wherein a number of filters that each respective convolutional LSTM module of the plurality of concatenated convolutional LSTM modules comprises increases with increasing depth of a position of each respective convolutional LSTM module,
    wherein the depth of the position is a position within a sequence of each respective convolutional LSTM module of the machine learning system relative to the first convolutional LSTM module of the plurality of concatenated convolutional LSTM modules,
    wherein a pooling layer is positioned between each of the convolutional LSTM modules, and
    wherein a second convolutional LSTM module of the plurality of the concatenated convolutional LSTM modules is connected to a fully connected neural network, which is parameterized to output an output variable of the machine learning system.

2. The machine learning system as claimed in claim 1, which is further parameterized to output an output variable that characterizes whether smoke is represented within the images.

3. The machine learning system as claimed in claim 1, which is parameterized, on the basis of each individual image of the images, to output a matrix as an output variable,
    wherein elements of the matrix are each assigned to a section of a predetermined plurality of sections of a respective image of the images, and
    wherein the elements of the matrix characterize whether smoke is represented within this assigned section of the respective image.

4. The machine learning system as claimed in claim 1, further comprising an input, wherein the input is configured to provide the sequence of images captured by a camera to the machine learning system.

5. The machine learning system as claimed in claim 1, wherein the machine learning system is further parameterized to determine an amount of the detected smoke based on the successive images of the sequence of images, wherein the amount of the detected smoke is at least one selected from a group consisting of: an intensity and a density.

6. The machine learning system as claimed in claim 1, wherein the convolutional LSTM module is configured to extract global information and temporal information of the successive images of the sequence of images together.

7. The machine learning system as claimed in claim 1, wherein the convolutional LSTM module is configured to process global information and temporal information of the successive images of the sequence of images together.

8. The machine learning system as claimed in claim 1, wherein the images are processed successively by the plurality of layers of the machine learning system, wherein a resolution of the processed image decreases with increasing depth of a position of each respective convolutional LSTM module, wherein the depth of the position is a position within a sequence of each respective convolutional LSTM module of the machine learning system relative to the first convolutional LSTM module of the plurality of concatenated convolutional LSTM modules.

9. The machine learning system as claimed in claim 1, wherein each of the plurality of convolutional LSTM modules are configured to process temporal and global information simultaneously.

10. A method for detecting smoke within an image by means of a machine learning system, which is parameterized, on the basis of a plurality of images captured in direct succession to detect smoke in the images,
wherein the machine learning system comprises a plurality of layers connected in a specified sequence and at least one of the plurality of layers comprises a convolutional recurrent neural network, wherein the convolutional recurrent neural network is a plurality of concatenated convolutional LongShortTermMemory (convolutional LSTM) modules,
wherein a number of filters that each respective convolutional LSTM module of the plurality of concatenated convolutional LSTM modules comprises increases with increasing depth of a position of each respective convolutional LSTM module,
wherein the depth of the position is a position within a sequence of each respective convolutional LSTM module of the machine learning system relative to a first convolutional LSTM module of the plurality of concatenated convolutional LSTM modules,
wherein a pooling layer is positioned between each of the convolutional LSTM modules, and
wherein a second convolutional LSTM module of the plurality of the concatenated convolutional LSTM modules is connected to a fully connected neural network, which is parameterized to output an output variable of the machine learning system, said method comprising the following steps:
obtaining a plurality of images captured in direct succession;
receiving an input variable at a first layer in the specified sequence, the first layer comprising the first convolutional LSTM module;
propagating the plurality of the captured images through the machine learning system in succession,
wherein during the propagation, the images are processed successively by the plurality of layers of the machine learning system and a final layer of the sequence of layers outputs an output variable.

11. The method as claimed in claim 10, wherein the machine learning system is trained on the basis of a plurality of training data, comprising training images (x) and respectively assigned training output variables ($y_s$),
wherein the training images (x) are propagated through the machine learning system during the training and, on the basis of the determined output variables of the machine learning system and the respectively assigned training output variables of the training images, a parameterization of the machine learning system is adjusted in such a way that a deviation between the determined output variables and the training output variables becomes a minimum.

12. The method as claimed in claim 10, wherein a smoke detector is activated on the basis of the determined output variable of the machine learning system.

13. The method of claim 10, wherein a resolution of the processed image decreases with increasing depth of a position of each respective layer, wherein the depth of the position is a position within a sequence of each respective layer of the machine learning system relative to the first layer.

14. The method of claim 10, further comprising processing temporal and global information simultaneously at each layer.

15. A non-transitory, computer-readable medium that contains instructions that when executed on a computer cause said computer to detect smoke within an image by obtaining a plurality of images captured in direct succession;
propagating the plurality of the captured images through a machine learning system in succession;
wherein the machine learning system comprises a plurality of layers connected in a specified sequence and at least one of the layers comprises a convolutional recurrent neural network,
wherein the convolutional recurrent neural network is a plurality of concatenated convolutional LongShortTermMemory (convolutional LSTM) modules,
wherein a number of filters that each respective convolutional LSTM module of the plurality of concatenated convolutional LSTM modules comprises increases with increasing depth of a position of each respective convolutional LSTM module,
wherein the depth of the position is a position within a sequence of each respective convolutional LSTM module of the machine learning system relative to a first convolutional LSTM module of the plurality of concatenated convolutional LSTM modules,
wherein a pooling layer is positioned between each of the convolutional LSTM modules,
wherein a second convolutional LSTM module of the plurality of the concatenated convolutional LSTM modules is connected to a fully connected neural network, which is parameterized to output an output variable of the machine learning system, and
wherein during the propagation, the images are processed successively by the layers of the machine learning system, wherein a first layer of the plurality of layers is the first convolutional LSTM module configured to receive an input variable from the plurality of images and a final layer of the sequence of layers outputs an output variable.

16. The non-transitory, computer-readable medium of claim 15, wherein each of the plurality of convolutional LSTM modules are configured to process temporal and global information simultaneously.

17. The non-transitory, computer-readable medium of claim 15, wherein a resolution of the processed image decreases with increasing depth of a position of each respective layer, wherein the depth of the position is a position within a sequence of each respective layer of the machine learning system relative to the first layer.

* * * * *